United States Patent
Xia

(10) Patent No.: US 9,095,162 B2
(45) Date of Patent: Aug. 4, 2015

(54) METHOD OF SEPARATING FAT, OIL OR GREASE FROM A LIQUID BODY SURFACE

(71) Applicant: Qun Xia, Weston, FL (US)

(72) Inventor: Qun Xia, Weston, FL (US)

(*) Notice: Subject to any disclaimer, the term of this patent is extended or adjusted under 35 U.S.C. 154(b) by 0 days.

(21) Appl. No.: 14/063,978

(22) Filed: Oct. 25, 2013

(65) Prior Publication Data

US 2015/0118373 A1 Apr. 30, 2015

(51) Int. Cl.
*A23L 1/015* (2006.01)

(52) U.S. Cl.
CPC .......................... *A23L 1/015* (2013.01)

(58) Field of Classification Search
CPC .................................. A23L 2/70; B01D 17/02
USPC .......... 426/475, 476, 589, 417; 210/767, 776; 261/7
See application file for complete search history.

(56) References Cited

U.S. PATENT DOCUMENTS

| | | | |
|---|---|---|---|
| 5,935,447 A * | 8/1999 | Febres et al. ................... | 210/703 |
| 2002/0096437 A1* | 7/2002 | Enomoto et al. ............... | 205/702 |
| 2012/0000839 A1* | 1/2012 | Li ................................. | 210/182 |
| 2014/0190897 A1* | 7/2014 | Wilson .......................... | 210/704 |

FOREIGN PATENT DOCUMENTS

| | | | |
|---|---|---|---|
| GB | 1291649 | * | 10/1972 |
| GB | 2064971 | * | 6/1981 |
| JP | 09206223 | * | 8/1997 |

OTHER PUBLICATIONS

Cassell's Dictionary of Cookery. 1883. p. 38. https://books.google.com/books?id=FykBAAAAQAAJ&dq=blowing+broth+grease+OR+oil+OR+fat&source=gbs_navlinks_s.*

* cited by examiner

*Primary Examiner* — Anthony Weier

(57) ABSTRACT

The defatting method pertains to a simple and practical removal of fat, oil or grease from a broth surface during cooking or right before eating, in order to consume broth without the floating oil, fat or grease for a better health. The embodiment of my method is to adopt a blower (28) generating air stream (22) and aiming at a specific area on the surface of broth (24) in a container (20), blowing out a certain area free or minimal of floating fat, oil or grease (26) on the broth surface. Then scoop out from this defatted area to extract broth (32) free or minimal of fat, oil or grease (26). Another embodiment of the defatting method is to tilt container (20) and level the liquid surface to the tip of the laid down side of container (20), divert forward air stream direction from the rear of container (20), continuously divert forward air stream direction to drive fat, oil or grease (26) until they completely overflow out of container (20), thereby leaving behind the fat free broth (24).

7 Claims, 11 Drawing Sheets

METHOD OF SEPARATING FAT, OIL OR GREASE FROM A LIQUID BODY SURFACE

BACKGROUND

Prior Art

The following is tabulation of some prior art that presently appears relevant:

| U.S. Patents | | |
|---|---|---|
| 2,575,768 | November 1951 | Pearsall |
| 2,735,551 | February 1956 | Walker |
| 2,913,117 | November 1959 | Gould |
| D202063 | August 1965 | Merz |
| D210399 | March 1968 | Wichmann |
| 4,024,057 | May 17, 1977 | McCoy |
| 5,077,900 | January 1992 | Jamentz |
| 5,199,349 | April 6, 1993 | Hansen |
| 5,367,775 | Nov. 29, 1994 | Tong, et al |
| 5,510,028 | April 1996 | Kuhlman |
| 5,526,737 | June 1996 | Betzen |
| 5,560,109 | Oct. 1, 1996 | Lam |
| 5,584,236 | Dec. 17, 1996 | Margolis |
| 5,894,668 | Apr. 20, 1999 | Cooke |
| 6,213,002 | Apr. 10, 2001 | Batten et al. |
| 6,435,078 | Aug. 20, 2002 | Batten et al. |
| 6,443,313 | September 2002 | Uli |
| 6,722,043 | Apr. 20, 2004 | Teng |
| 7,901,575 | Mar. 8, 2011 | Reyes |

| Foreign Patent Documents | | | |
|---|---|---|---|
| Foreign Doc. Nr. | Cntry Code | Pub. Dt | App or Patentee |
| 0580/92 | DK | May 1, 1992 | Hansen |
| A47J43128 | KR | Apr. 4, 2012 | Cho Eun De |
| CN202426146U | CN | Sep. 12, 2012 | Hua Chun Rong |
| CN103263230A | CN | Aug. 28, 2013 | Wu Ming Hua |

Soup and broth are in one category of the most important foods that we've been living on in our daily lives and have accompanied us along with the human civilizations. Cooking soup or broths such as chicken soup, beef soup, broths, stocks, stews and soupy noodles etc, are an integral part of human cuisines. Flavoring and seasoning products and processed foods flavored by derivatives from all kinds of broths are even more than we could count. Broths and soups taste pleasant and contain a plurality of benefiting nutrients, thus enjoyable for people at all ages.

To state my method in a concise and simple way, the term of broth should stand for all kinds of liquid media, and not limited in only referring to soups, stocks, stews and soupy noodles as mentioned above.

In modern life, health issues are increasingly a concern, particularly in regard to health problems and diseases caused by overconsumption of fat, oil or grease.

During the process of cooking broth in the food processing industry, restaurants, or at home, what faces the people the most is how to easily remove and completely remove unwanted fat, oil or grease floating on the top of broth; or how to minimize the dietary intake of unwanted fat, oil or grease floating on the top of the cooked broth.

However, getting rid of the floating fat, oil and grease from broth surface has not been an easy or effective task during the process of either cooking or eating. The consequence has been a restraint on people from cooking and consuming more fresh broth and its derivative soups and many other related foods on a regular basis, thus consuming less on this entire category of nutritious food.

The liquid forms of fat, oil or grease in lower densities are not dissolved in the broth, but actually separated from the broth and floating on the aqueous liquid surface. The following lists up various previous attempts of methods and devices pertaining to the removal of unwanted fat, oil and grease from the top of the broth:

Directly use spoons, ladles, or similar utensils with handles to skim off fat, oil or grease on the top of water based broth. This has been the most common method for the removal of fat, oil or grease but needs to be repeated for many times. In the case of broth carrying oil, fat or grease is served in a bowl for final consumption, it's nary possible to do this type defatting on the table because of the inconvenience and manners we think about. When unwanted fat, oil or grease become less accumulated, the floating layer becomes thinner on the broth surface, making it harder for further skimming and removals.

Absorbent materials for instance, absorbent pads, paper towel, oil absorbing paper, or even bread etc. are put on the surface of the broth in a container. Once getting socked and soiled by fat, oil, or grease together with certain amount of the broth, pick up and toss away the wetted absorbent materials. This method is cluttered and messy, cannot completely defat oil, fat or grease, but easily contaminates the surrounding areas near the container.

Put the hot or warm broth in a container into a refrigerator to cool down and freeze fat, oil or grease into the solid form for easier skimming and removal afterwards. This method would not allow the immediate serving and consumption of the broth free or minimal of fat, oil or grease. In addition, refrigerating and reheating processes are needed before serving and consumption. The defatting procedures of this method might help remove fat, oil or grease thoroughly. However, the entire process is tedious and takes a long time, not to mention the energy wasted from freezing to reheating and cycling back up to the desired temperature for eating. It misses the point of taking the delicacy of freshly prepared broth and sometimes the solid foods that come with it, and backlashes the desire and hanger for the broth right after cooking as well.

Specifically designed skimming and collecting devices have been proposed, for example, in U.S. Pat. Nos. 7,901,575 (2011), 6,722,043 (2004), 6,443,313 (2002), 7,901,575 (2011), 5,894,668 (1999). They need extra mental and body concentrations during the manual skimming process that has to be repeated for many times. Cautions are taken particularly when dealing with the hot broth. These skimming devices not only skim off oil, fat or grease but also carry and waste much of the broth. These skimming devices leave certain amount of fat, oil, or grease behind on the broth since the layer of floating oil, fat or grease gets thinner gradually and makes it harder for further skimming.

Electrical and mechanical fat and water separation apparatus or machines are too complicated for regular cooking at home and are not realistic before the simple consumption. For example, U.S. Pat. No. 6,213,002 (2001) discloses a grease removal system comprising of electrical components, circuit board and mechanical designs and it is no doubt that this type of apparatus will be costly. Another example is U.S. Pat. No. 6,443,313 (2002), an apparatus comprising of a plurality of parts that need good amount of cleanings later on.

None of the above mentioned methods or devices could help removing fat, oil or grease from the broth surface effectively in a simple manner.

In addition, none of the above mentioned existing methods or devices are suitable for defatting the broth right before eating, or simply allow consuming the delicious broth without taking in unwanted fat, oil or grease. In a restaurant, when the broth as ordered is served with much fat, oil or grease floating on the surface, neither of the mentioned methods will allow one to eat the broth without oil, fat or grease, nor skim off fat, oil or grease in an appropriate manner.

Based on the previous shortcomings of fat, oil or grease removal methods or devices, my defatting method discloses a far more efficient, simple and practical way to remove fat, oil or grease floating on the broth. My defatting method also allows comfortable consumption of broth and solids that come with it without the dietary intake of floating fat, oil or grease.

SUMMARY

In a cooking pot or a container where a broth is heated up to boiling or kept simmering, fat, oil or grease that disintegrate from meat or bones will float up to the broth surface. My defatting method is to adopt a blower generating air stream, aiming at a surface area of the broth surface. Fat, oil or grease floating on the surface where the air stream is targeting is blown or driven aside to accumulate thicker at where there is no or less air flows.

When the air stream volume and direction are set relatively stabilized, the targeted area on the broth surface in the container appears free or minimal of fat, oil, or grease. One example is to set the volume of the air stream, aim the air stream at the center of cooked broth surface in the container. Fat, oil or grease at the central surface area of the broth is blown or driven aside to the surrounding areas along the circumference of the container. Fat, oil or grease will accumulate at the surrounding areas and build up a thicker layer than before.

Another example is to set the volume of the air stream and aim at the cooked broth surface near one side of container wall. Fat, oil or grease on the broth surface will be blown and driven aside to the other side of the container completely, getting accumulated and building up a thicker layer than before.

When the status is balanced and stabilized, use a ladle or spoon to scoop out the broth from where it is free or minimal of fat, oil or grease on the surface. The scooped out broth through these procedures becomes fat free or minimal, that meets the needs for people to consume broth.

In the case of broth served in a soup bowl covered with fat, oil or grease on the surface, use a blower set at the suitable volume of the air stream at an adjusted distance from the bowl. Air stream targeting the broth surface will blow out a surface area free or minimal of fat, oil or grease. Use a spoon to take the broth out of the defatted area for direct consumption. It is a spoonful of broth for dietary intake free or minimal of fat, oil or grease.

Another example of the defatting method is to tilt the container of cooked broth, allowing the liquid surface leveled with the tip of the laid down side of the container. Use a blower generating air stream aiming from the rear of the container, divert the direction of the air stream from the rear to the front of the container and keep blowing. Fat, oil or grease will be blown or driven forward to the tip of the laid down side of the container. Driven by the air stream, fat, oil, or grease will be eventually forced to overflow to the outside of the container. During this process, a certain amount of broth will be carried out with fat, oil or grease. However, some practices will significantly help reduce the overflow amount of the broth. In the case of manual controls of the blower and forward diversion of the air stream direction from the rear of the container, additionally operate the air stream in a left and right oscillating pattern to generate sweeping motions. These additional sweeping motions will inhibit the flow back of fat, oil or grease on either side of the broth surface, thus facilitating to drive fat, oil or grease out of the container quicker and more effectively.

The method mentioned in the present invention will apply not only to the defatting process of the broth, but also to floating accumulated impurity and foam removals, and force cooling the broth under the assistance of the air stream blowing to the surface of the broth in the container, for all home and restaurant cooking, direct consumptions, industrial food processing, and other industrial processing.

DRAWINGS

Figures

In the drawings, closely related figures have the same number but different alphabetic suffixes.

Figure 1A:
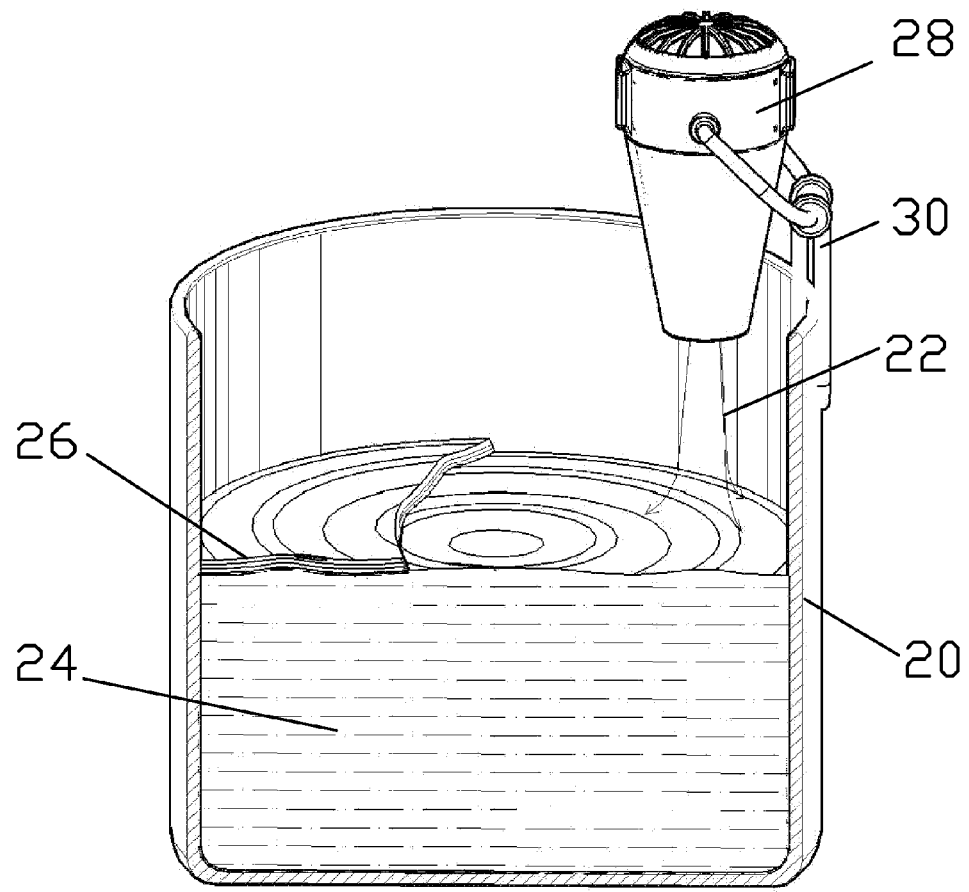
FIG. 1A is an elevated and cross-sectional view of a blower generated air stream directing to the broth surface near one side of a container wall and drives floating oil, fat or grease to the other side of the container in accordance with the embodiment.

| Drawings—Reference Numerals | | | |
|---|---|---|---|
| 20 | container | 21 | bowl |
| 22 | air stream | 24 | broth |
| 26 | oil, fat or grease | 28 | blower |
| 30 | support and clip assembly | 32 | extracted broth |
| 34 | ladle | 36 | spoon |

DETAILED DESCRIPTION

Figure 1B:
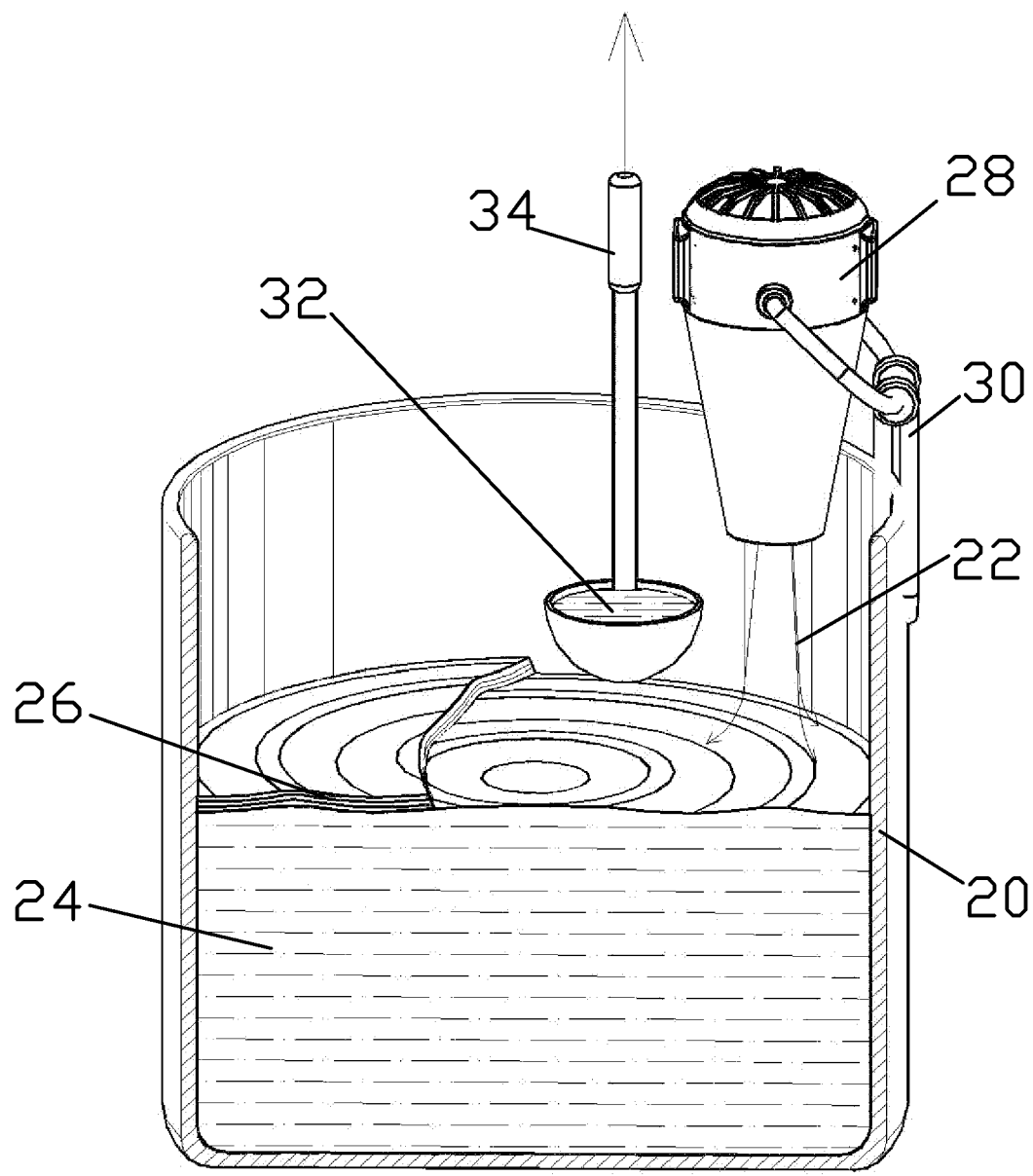
FIG. 1B is an elevated and cross-sectional view of a ladle scooping out the broth free or minimal of oil, fat or grease from the defatted area of the broth surface in a container under the assistance of the air stream.

One embodiment of my defatting method is illustrated in FIG. 1A and FIG. 1B. A container 20 holds cooked broth 24 with oil, fat or grease 26 floating on the top of broth 24. It is a common sense that oil, fat or grease as lighter liquids should evenly float on top of water or aqueous broth surface in containers. This normal phenomenon of statically leveled liquids floating evenly on the top of another is not shown in any drawings or figures for this embodiment. However, what is illustrated in FIG. 1A and FIG. 1B is that driven by air stream 22, lighter oil, fat or grease 26 start to move aside from where air stream 22 targets on the broth surface and build up thicker on the other side of the broth surface.

FIG. 1A discloses a cluster of continuous air stream 22 generated by a blower 28 targeting a broth surface area next to the side of the container wall. Blower 28 is fastened on container 20 by support and clip assembly 30. Floating oil, fat or grease 26 used to be evenly distributed on the top of the broth are driven away from where air stream 22 aims at, to the other side of the broth surface in container 20. Since air stream 22 is continuously and steadily blowing to same area on the broth surface, this surface area on broth 24 is made free or minimal of oil, fat or grease 26.

FIG. 1B discloses that air stream 22 is continuously and steadily blowing to the same area on the broth surface, which is free or minimal of oil, fat or grease 26. Oil, fat or grease 26 stay steadily on the other side of the broth surface in container 20. This balanced and stabilized status allows a ladle 34 to scoop defatted broth 32 from the surface area of broth 24 out of container 20. The arrow on the top of ladle 34 indicates the moving direction of ladle 34 carrying defatted broth 32 out of container 20, thus completing the process for this scoop of defatted broth extraction and to be repeated for remaining broth 24.

Figure 2A:
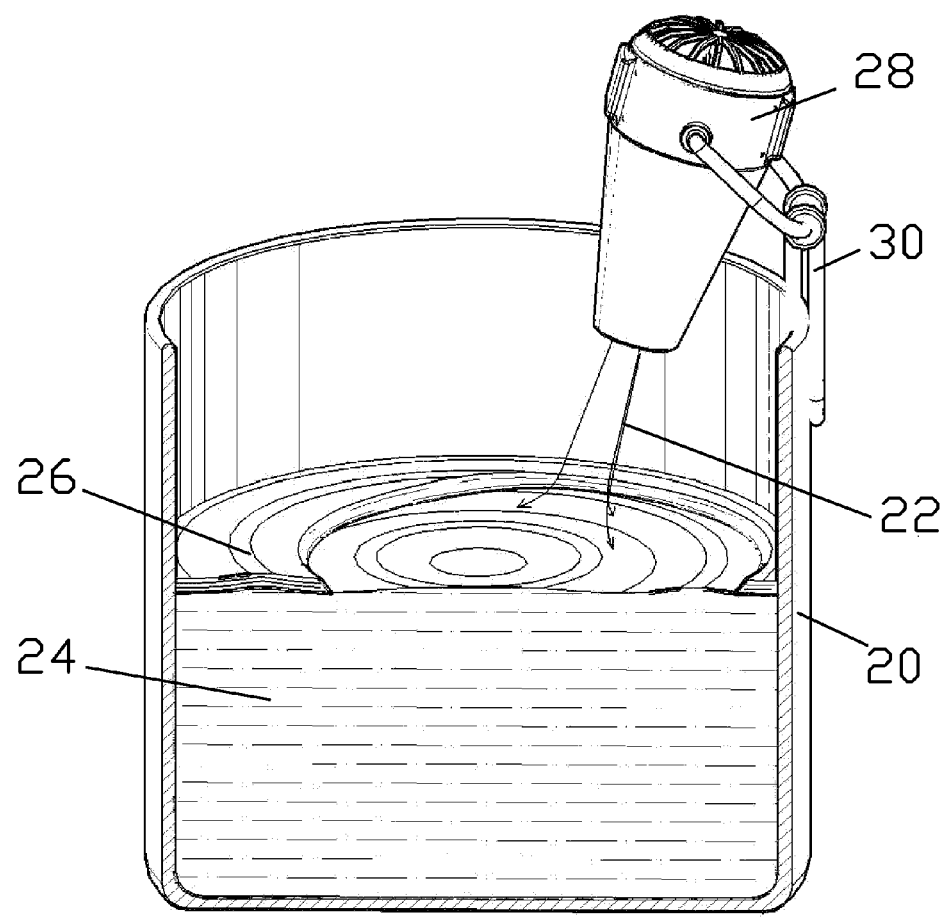
FIG. 2A is an elevated and cross-sectional view of a blower generated air stream directing to the central area of the broth surface in a container and drives oil, fat or grease to the surrounding areas in accordance with the embodiment.
Figure 2B:
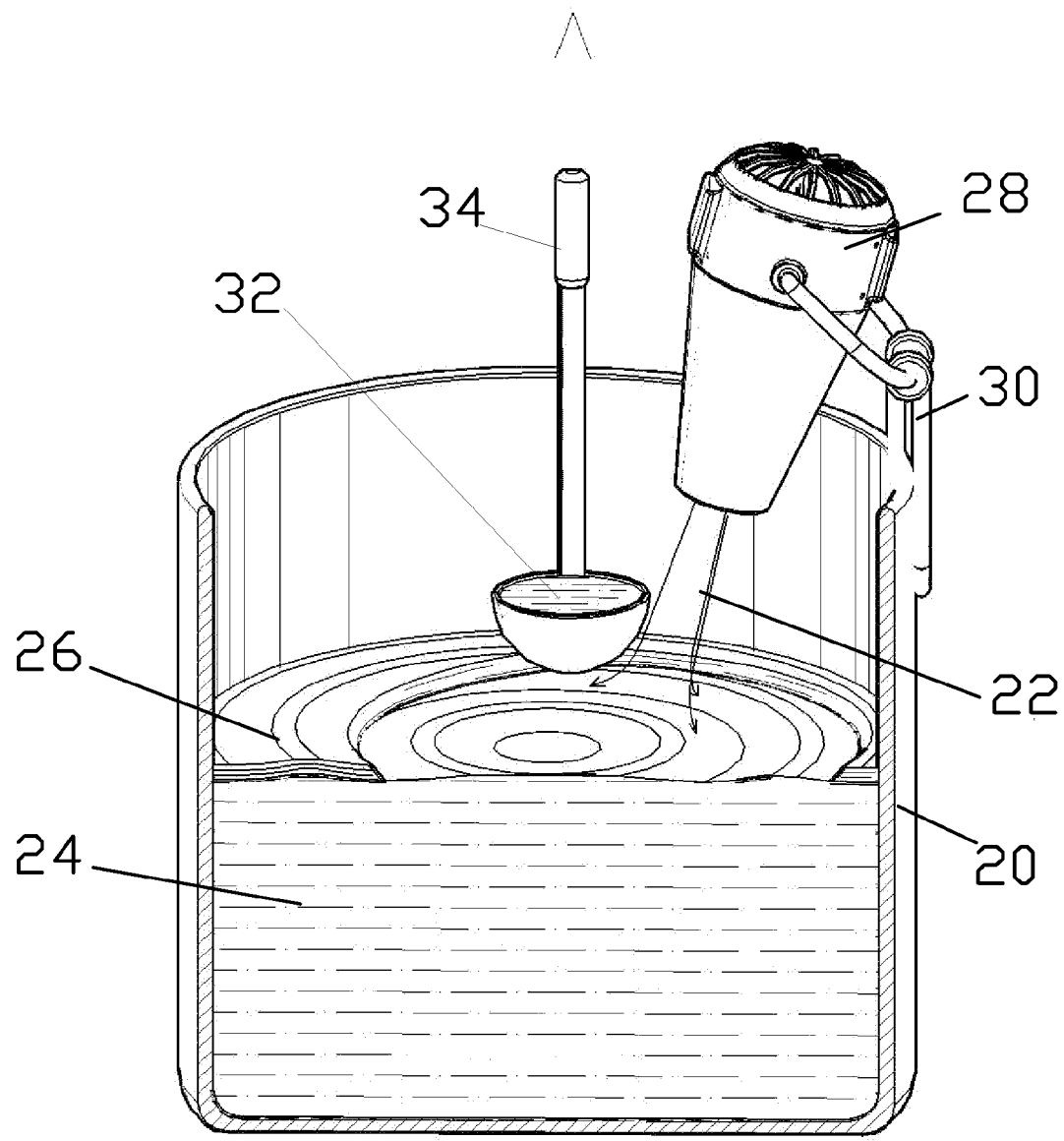
FIG. 2B is an elevated and cross-sectional view of a ladle scooping out the broth free or minimal of oil, fat or grease from the defatted area of the broth in a container under the assistance of the air stream in accordance with the embodiment.

Another embodiment of my defatting method is illustrated in FIG. 2A and FIG. 2B. A container 20 holds cooked broth 24 and oil, fat or grease 26 floating on the top of broth 24. It is a common sense that oil, fat or grease as lighter density liquids evenly float on top of water or aqueous broth in containers. This normal phenomenon of statically leveled liquid floating evenly on the top of another is not shown in any drawings or figures for this embodiment. However, driven by air stream 22, lighter oil, fat or grease 26 start to move away from where air stream 22 aims at on the broth surface and build up thicker at the surrounding areas on the broth surface.

FIG. 2A discloses a cluster of continuous air stream 22 generated by a blower 28 targeting a broth surface area in the middle of a container 20. Blower 28 is fastened on container 20 by support and clip assembly 30. Floating oil, fat or grease 26 used to be evenly distributed on the top of the broth surface are driven away from where air stream 22 aims at, to the surrounding areas on the broth surface. Since air stream 22 is continuously and steadily blowing to the same area on the broth surface, this surface area on broth 24 is made free or minimal of oil, fat or grease 26.

FIG. 2B discloses that air stream 22 is continuously and steadily blowing to the central area on the broth surface, which is free or minimal of oil, fat or grease 26. Oil, fat or grease 26 stay at the surrounding areas on the broth surface in container 20. This balanced and stabilized status allows a ladle 34 to scoop defatted broth 32 from the surface area of broth 24 out of container 20. The arrow on the top of ladle 34 indicates the moving direction of ladle 34 carrying defatted broth 32 out of container 20, thus completing the process for this scoop of broth extraction and to be repeated for remaining broth 24.

Figure 3A:
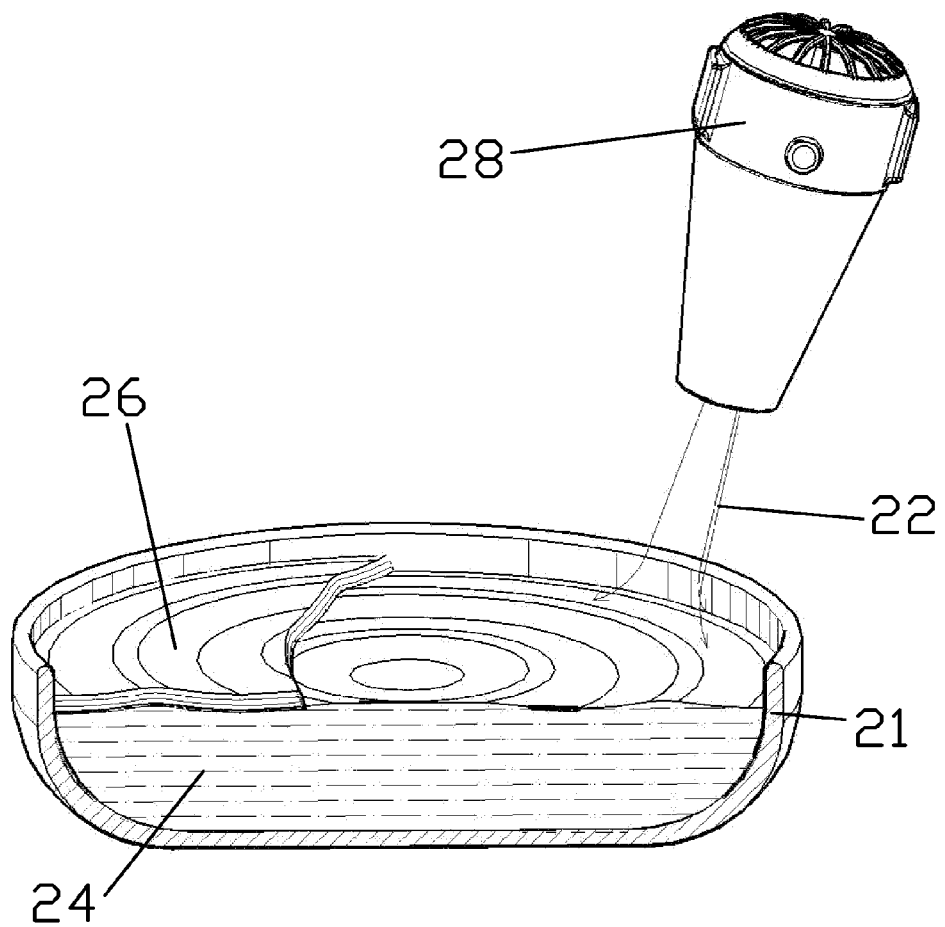
FIG. 3A is an elevated and cross-sectional view of a blower generated air stream directing to the broth in a bowl to generate an area free or minimal of oil, fat or grease in accordance with the embodiment.
Figure 3B:
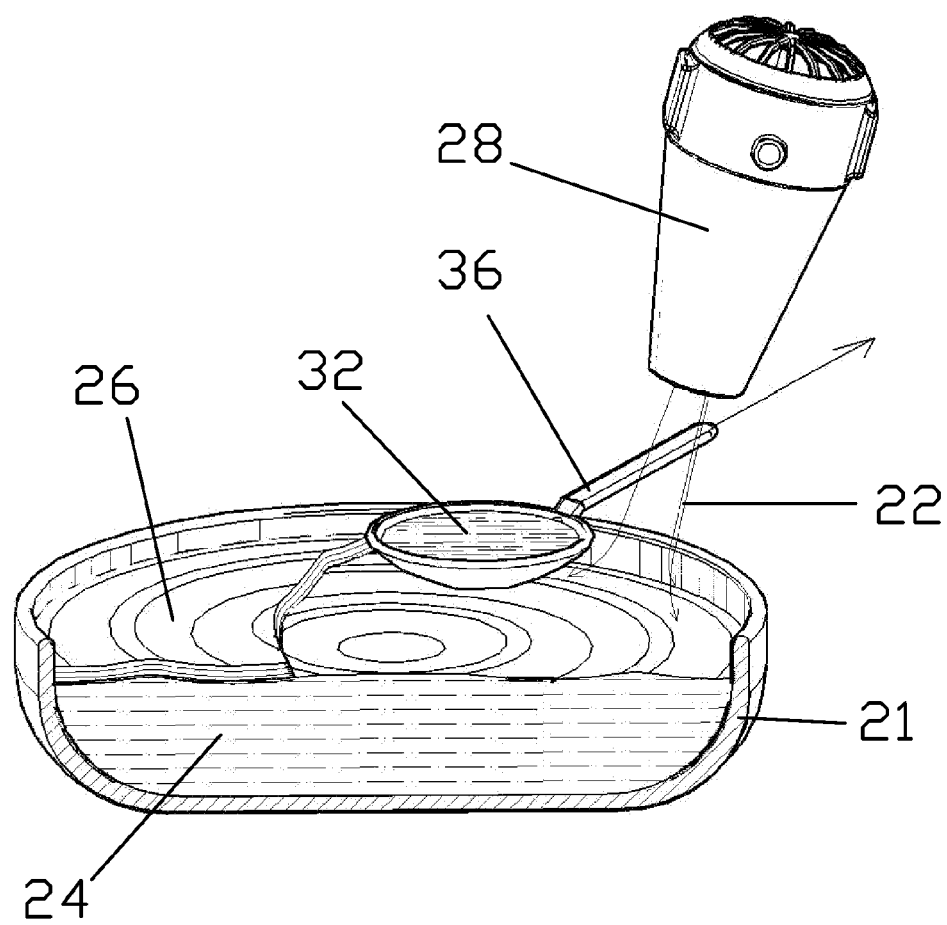
FIG. 3B is an elevated and cross-sectional view of a spoon scooping out the broth free or minimal of oil, fat or grease from the defatted area in a bowl under the assistance of the air stream for direct consumption in accordance with the embodiment.

Another embodiment is shown in FIG. 3A and FIG. 3B, which discloses a defatting or broth extraction process right before dietary intake of broth 32. FIG. 3A discloses a cluster of continuous air stream 22 generated by a blower 28 targeting a broth surface area on one side of a bowl 21. Floating oil, fat or grease 26 used to be evenly distributed on the top of the broth surface are driven away from where air stream 22 aims at, to the other side of the broth surface in bowl 21. Since air stream 22 is continuously and steadily blowing to same area on the broth surface, this surface area on broth 24 is made free or minimal of oil, fat or grease 26.

FIG. 3B discloses that air stream 22 is continuously and steadily blowing to the same area on the broth surface, which is free or minimal of oil, fat or grease 26. Oil, fat or grease 26 stay steadily on the other side of the broth surface in bowl 21. This balanced and stabilized status allows a spoon 36 to scoop defatted broth 32 from the surface area of broth 24 out of bowl 21, then for our direct consumption. The arrow on spoon 36 indicates the moving direction of spoon 36 carrying defatted broth 32 out of bowl 21, thus completing the process of this scoop of broth extraction for our direct consumption and then to be repeated for remaining broth 24.

Figure 4A:
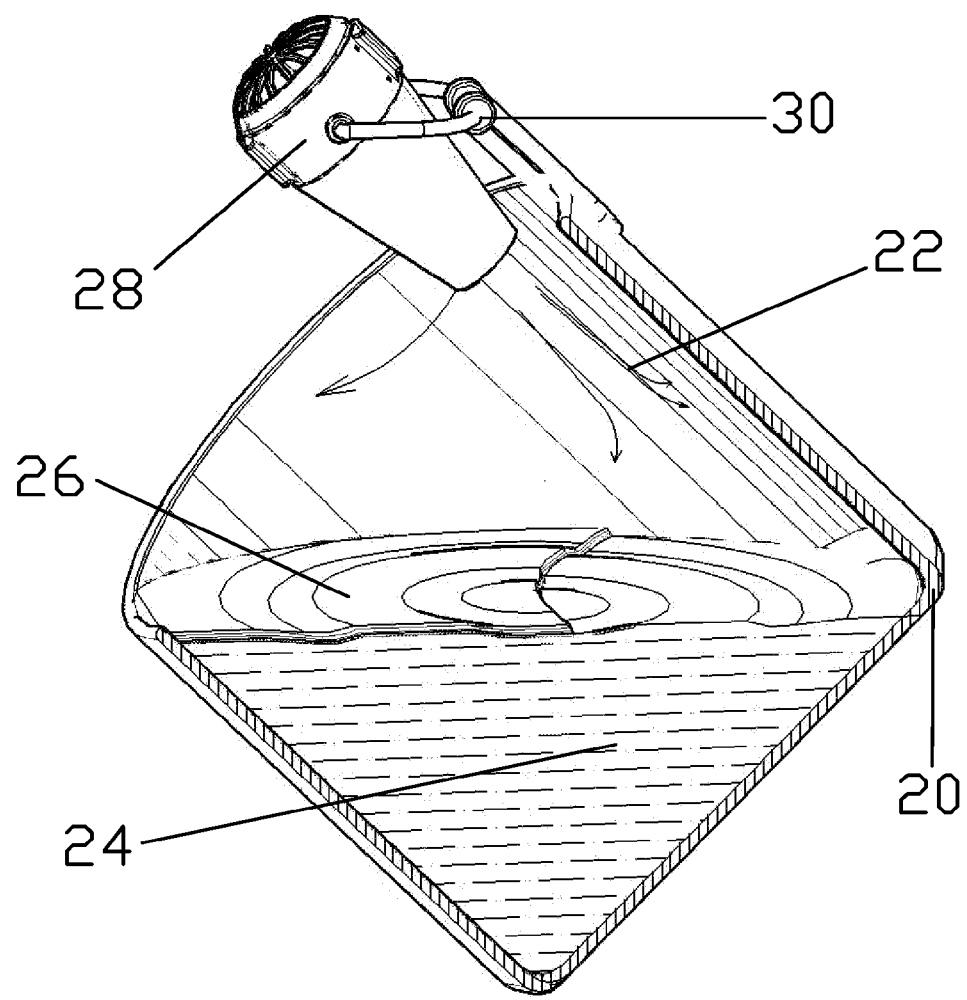
FIG. 4A is an elevated and cross-sectional view of the air stream blowing to the rear of a tilted container in which the broth and floating oil, fat or grease level with the tip of the container laid down side in accordance with the embodiment.
Figure 4B:
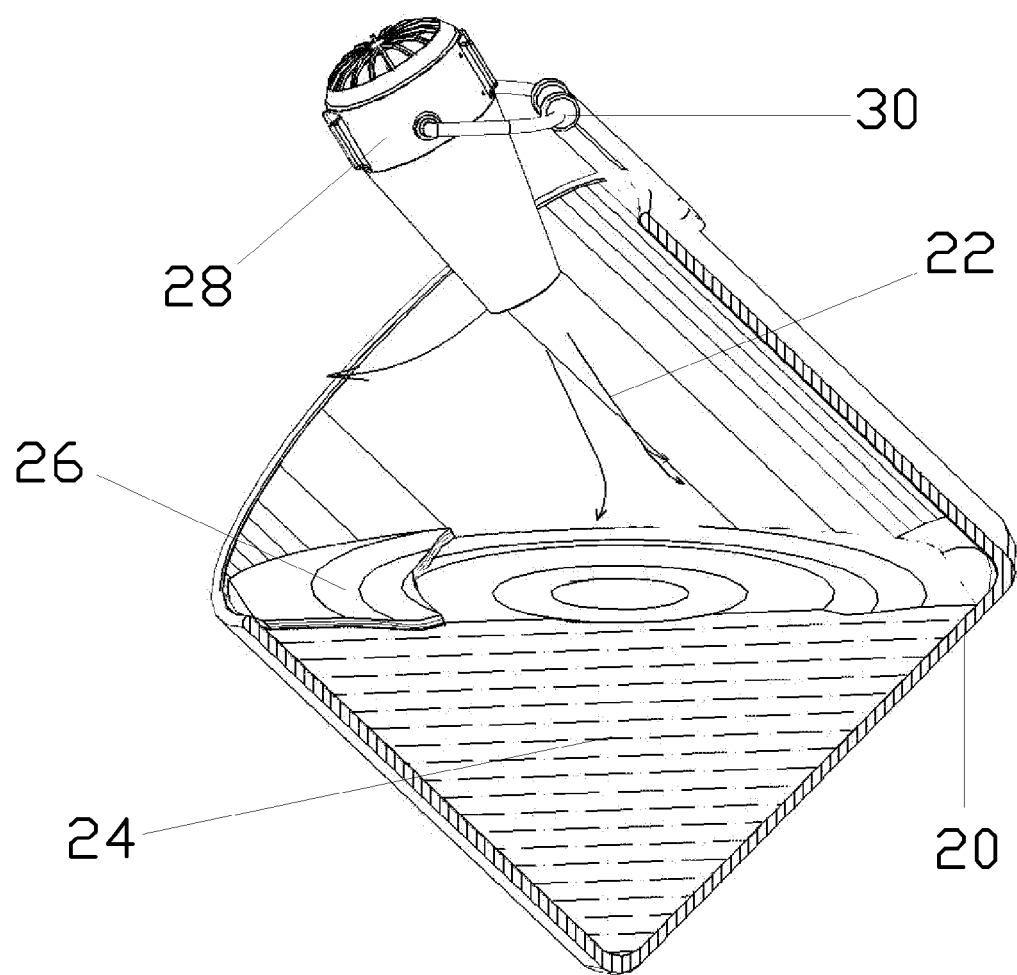
FIG. 4B is an elevated and cross-sectional view of the air stream being diverted forward drives oil, fat or grease toward the tip of the laid down side of a tilted container.
Figure 4C:
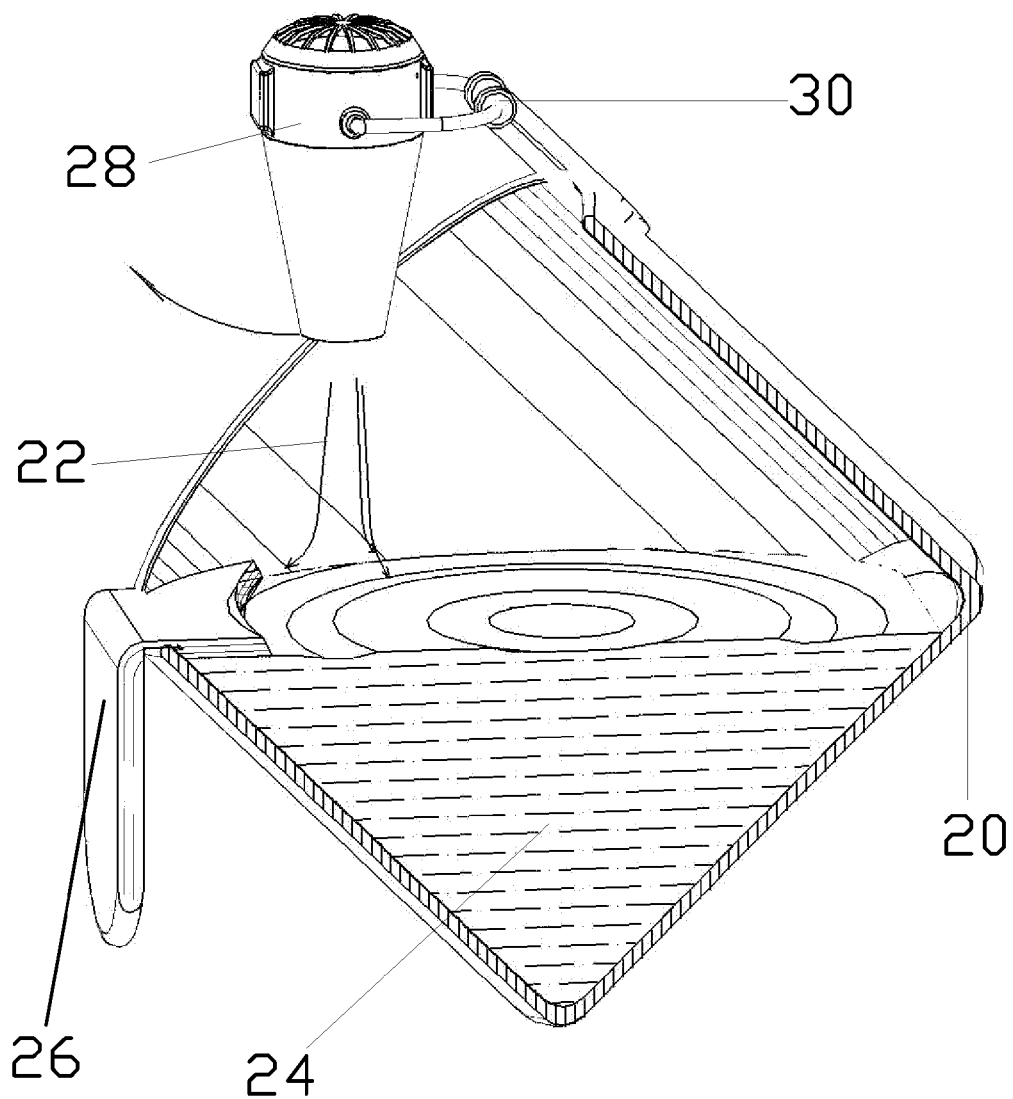
FIG. 4C is an elevated and cross-sectional view of air stream continuously being diverted forward drives oil, fat or grease to overflow the tip of the laid down side of a tilted container.
Figure 4D:
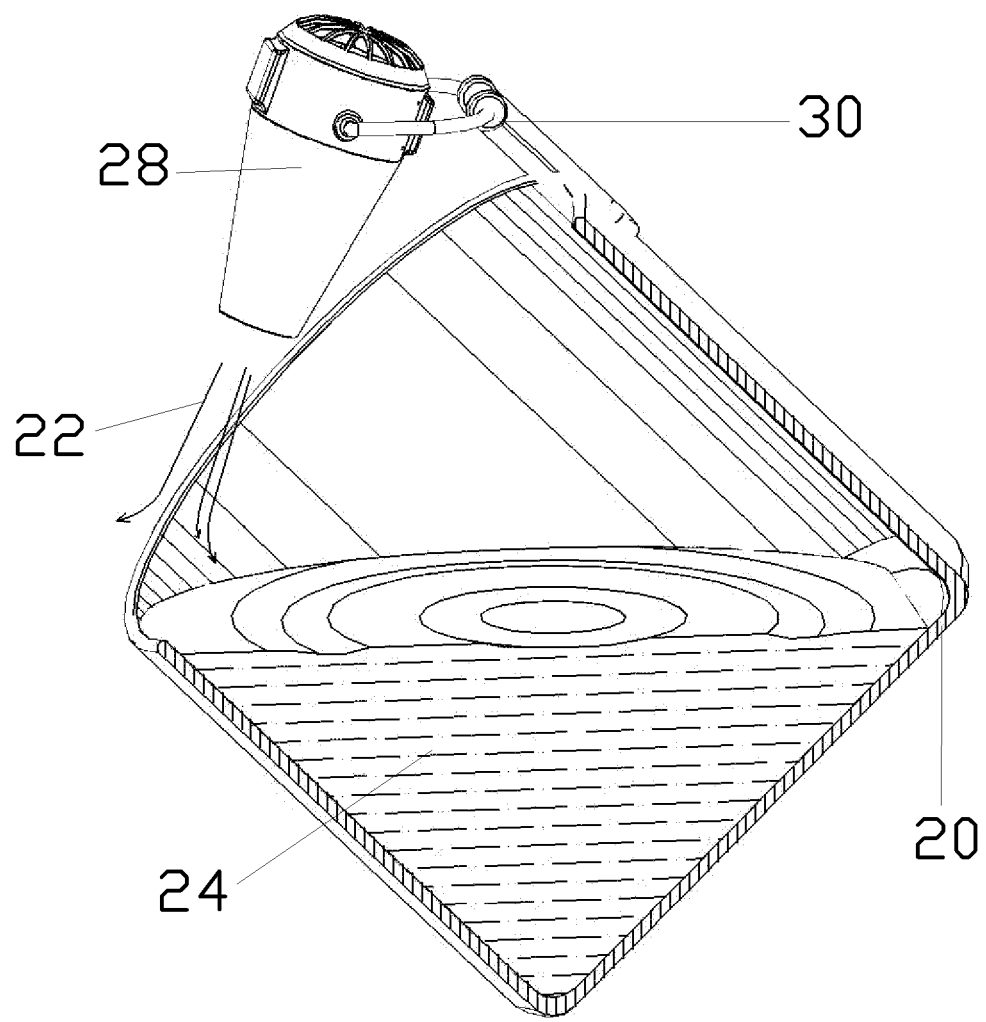
FIG. 4D is an elevated and cross-sectional view of the air stream continuously being diverted forward completely removes oil, fat or grease from the broth in a tilted container.

An additional embodiment is illustrated in FIG. 4A, FIG. 4B, FIG. 4C and FIG. 4D. FIG. 4A discloses a cluster of air stream 22 generated by a blower 28 blowing toward the rear end of a tilted container 20 which holds floating oil, fat or grease 26 and cooked broth 24 leveled with the tip of the laid down side of container 20. Blower 28 is fastened on container 20 by support and clip assembly 30. Air stream 22 continuously blows to the rear end of container 20, generating an initial smaller broth surface area free or minimal of oil, fat or grease 26. The arrow indicates the movement trajectory of blower 28 and the forward diversion of the air stream direction. Based on what have been illustrated in FIG. 4A, FIG. 4B discloses that the broth surface area free or minimal of oil, fat or grease is increased in size because forward diverted air stream 22 has driven oil, fat or grease 26 forward. The arrow indicates the moment trajectory of the blower 28 and the forward diversion of the air stream direction. Based on what have been illustrated in FIG. 4A and FIG. 4B, FIG. 4C discloses that the broth surface area free or minimal of oil, fat or grease is further increased in size because diverted air stream 22 has driven oil, fat or grease 26 even further forward, building up thicker at the front and overflowing the tip of laid down side of tilted container 20 to the outside. The arrow indicates the continuous movement trajectory of blower 28 and forward diversion of the air stream direction. Based on what have been illustrated in FIG. 4A, FIG. 4B and FIG. 4C, FIG. 4D discloses that the broth surface free or minimal of oil, fat or grease expands to the entire area in tilted container 20. Oil, fat or grease 26 disappear from the broth surface in tilted container 20, thus completing the process of oil, fat or grease removals and broth extraction.

Figure 5:
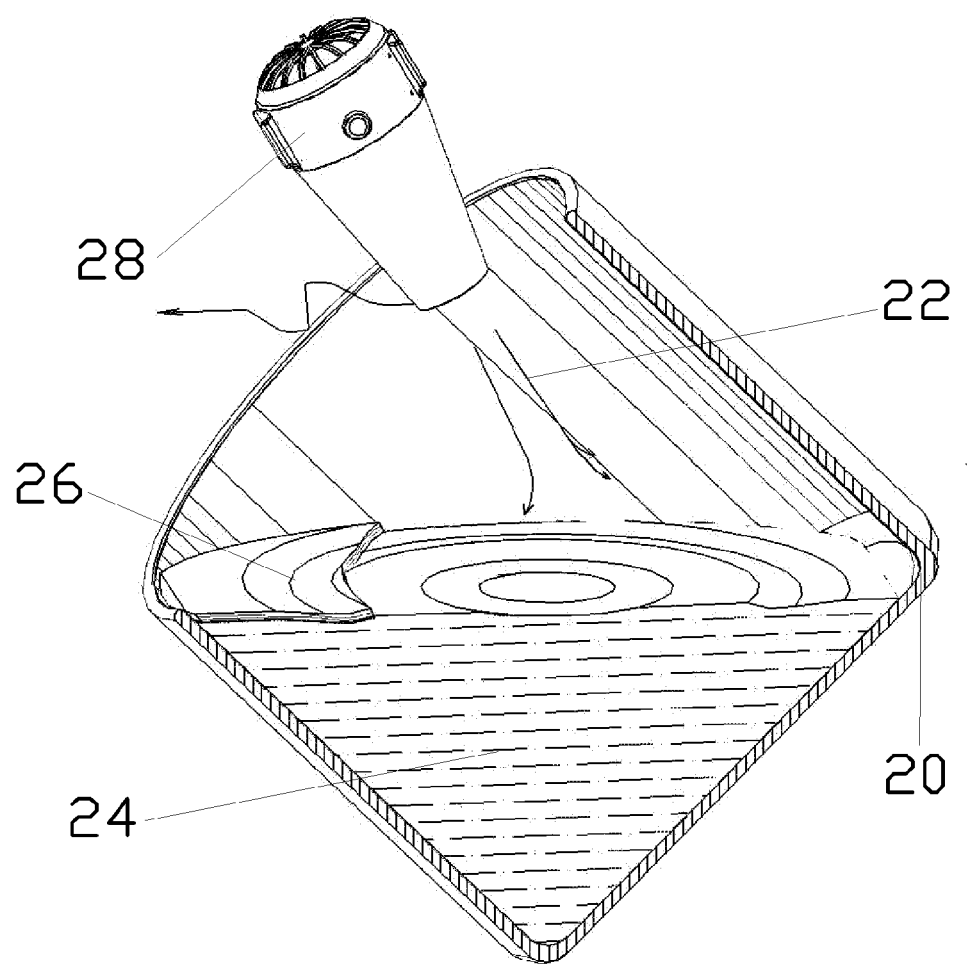
FIG. 5 is an elevated and cross-sectional view of the air stream being diverted forward and also in left and right sweeping and oscillating motions drives oil, fat or grease to the tip of the laid down side of a tilted container.

A ramification of the above embodiment is illustrated in FIG. 5. FIG. 5 discloses extra motions of a blower 28 applied in addition to the embodiment illustrated in FIG. 4A, FIG. 4B, FIG. 4C and FIG. 4D. Coupled with the indicated forward trajectory of blower 28 and forward diversion of the air stream direction, additional motions of blower 28 and diversions of air stream 22 in a left and right sweeping and oscillating pattern are introduced. These motions could be easily performed in a manual manner. The air stream 22 left and right sweeping and oscillating motions together with its forward motions as indicated by the arrow in FIG. 5, prevents flow back of oil, fat or grease 26 on either side of the surface of broth 24 in tilted container 20. These extra motions make it more efficient and convenient for manual operations in driving oil, fat and grease 26 out of tilted container 20 eventually.

Advantages

From the description above, a number of advantages of the embodiments of my defatting method become evident:

(a) Air stream targets in specified directions and result in certain surface areas free or minimal of oil, fat or grease on the broth can be easily generated by a blower, a handy and economical appliance.

(b) The defatting process and results from the cooked broth are effective and efficient, fast for serving and for direct consumption without the intake of oil, fat or grease.

(c) Compared to existing defatting methods and devices, my broth defatting method is simple and applicable to either household or restaurant cooking and dining, and even to industrial food processing and other industries.

(d) The defatting method helps create new apparatus for the cooking and defatting purposes. The means generating the air stream will become novice appliances in assisting cooking and food preparations.

(e) Unlike many other skimming devices, using my method will be in a relaxed and simple manner, and without contaminating the surrounding areas and extra cleaning.

(f) It is not necessary any more to put hot cooked broth into a refrigerator to freeze oil, fat or grease into solids for a thorough removal, and then warm it up again for serving and dietary intake. It saves energy, time and the flavor of broths and its solids for immediate consumption without oil, fat or grease.

(g) The benefits from the easily defatted broths will encourage people to cook and consume more of the simmered and boiled broths, liquids and many other related foods and derivatives that contain a plurality of nutrients for a better health.

Conclusion, Ramifications, and Scope

Accordingly, the reader will see that the air stream method of removing oil, fat or grease from aqueous broths is simple and convenient for cooking, serving and consumption of this type of foods. It leads to more consumption of broth, its equivalents, and many other related foods and derivatives.

Although the description above contains many specificities, these should not be construed as limiting the scope of the embodiments but as merely providing illustrations of some of several embodiments. For example, the broth surface areas free or minimal of oil, fat or grease blown by air stream can be used for scooping both liquid and solid foods that come with it, or to facilitate easier skimming and removing built up oil, fat or grease with a plurality of skimming devices. Another example is that, in a continuous separation process between floating oil, fat or grease and the underneath liquid body due to various specific densities, suction tubes or pipes can be applied to specifically collect either the top tier of the liquids or the lower tier of the liquids since both tiers of the liquids are separated and concentrated under the assistance of air stream.

Therefore the scope of the embodiments should be determined by the appended claims and their legal equivalents, rather than by the examples given.

Accordingly what is claimed is:

1. A method of separating fat, oil or grease from the surface of a liquid body comprising:
    a) Providing an air stream generated by a blowing device
    b) Providing said liquid body having said fat, oil or grease floating on the top in a container
    c) Aiming said air stream at a selected surface area of said fat, oil or grease floating on the top of said liquid body in said container, said air stream blowing and driving said fat, oil or grease aside, thereby generating said surface area of said liquid body free or minimal of said fat, oil or grease while also generating a surface area of accumulated said fat, oil or grease in said container,
    whereby removing said fat, oil or grease or extracting liquid from said surface area of said liquid body free or minimal of fat, oil or grease in said container, said method allowing for dietary intake of said liquid free or minimal of said fat, oil or grease.

2. A method of claim 1 further comprising the step of generating said air stream with a blowing device to blowout said surface area free or minimal of said fat, oil or grease on the top of said liquid body.

3. A method in claim 1 further comprising the step of extracting said liquid from said surface area of said liquid body free or minimal of fat, oil or grease under the assistance of said air stream while said fat, oil or grease is held at surrounding areas on the surface of said liquid body in said container.

4. A method in claim 1 further comprising the step of removing said accumulated fat, oil or grease from the top of said liquid body in said container under the assistance of said air stream.

5. A method in claim 4, wherein comprising diverting said air stream direction to expand the size of said surface area free or minimal of said fat, oil or grease and eventually blowing and driving said accumulated fat, oil or grease from one side of said liquid body to the other side and off the edge of said container.

6. A method in claim 1, wherein comprising means of removing floating accumulated impurities or foams under the assistance of said air stream blowing to the surface of said liquid body in said container.

7. A method in claim 1, wherein comprising means of force cooling said liquid body under the assistance of said air stream blowing to the surface of said liquid body in said container.

* * * * *